(12) United States Patent
Jochem Sanz

(10) Patent No.: US 11,399,288 B2
(45) Date of Patent: Jul. 26, 2022

(54) METHOD FOR HTTP-BASED ACCESS POINT FINGERPRINT AND CLASSIFICATION USING MACHINE LEARNING

(71) Applicant: SAMSUNG ELETRÔNICA DA AMAZÔNIA LTDA., São Paulo (BR)

(72) Inventor: Igor Jochem Sanz, São Paulo (BR)

(73) Assignee: SAMSUNG ELETRONICA DA AMAZONIA LTDA., Campinas (BR)

( * ) Notice: Subject to any disclaimer, the term of this patent is extended or adjusted under 35 U.S.C. 154(b) by 140 days.

(21) Appl. No.: 16/905,878

(22) Filed: Jun. 18, 2020

(65) Prior Publication Data

US 2021/0258791 A1     Aug. 19, 2021

(30) Foreign Application Priority Data

Feb. 13, 2020   (BR) ............... 10 2020 003104 0

(51) Int. Cl.
| | |
|---|---|
| *H04W 12/122* | (2021.01) |
| *G06N 20/20* | (2019.01) |
| *H04L 9/40* | (2022.01) |
| *H04W 12/60* | (2021.01) |
| *H04W 12/79* | (2021.01) |

(52) U.S. Cl.
CPC ......... *H04W 12/122* (2021.01); *G06N 20/20* (2019.01); *H04L 63/1466* (2013.01); *H04W 12/66* (2021.01); *H04W 12/79* (2021.01)

(58) Field of Classification Search
CPC ..... H04W 48/16; H04W 48/02; H04W 48/12; H04W 12/122; H04W 12/12; H04W 12/73; H04W 12/121; H04W 12/79; H04W 12/66; H04W 24/08; H04W 24/04; H04W 88/08; H04W 84/12; G06N 20/00; G06N 20/20; H04L 63/10; H04L 63/1408; H04L 63/1416; H04L 63/1466; H04L 43/10; H04L 43/04; H04L 41/16; H04L 41/12

See application file for complete search history.

(56) References Cited

U.S. PATENT DOCUMENTS

| | | | |
|---|---|---|---|
| 7,808,958 B1 * | 10/2010 | Hernacki ............... | H04W 12/12 370/338 |
| 2018/0205749 A1 * | 7/2018 | Nandha Premnath ............. | H04W 12/128 |
| 2019/0130019 A1 * | 5/2019 | De ............... | H04L 61/6004 |
| 2021/0136587 A1 * | 5/2021 | Ren ............... | H04L 9/0866 |

* cited by examiner

*Primary Examiner* — Brian F Shaw

(57) ABSTRACT

A method for HyperText Transfer Protocol (HTTP) based fingerprint and classification. The method includes training a HTTP-based machine-learning model, using machine-learning training techniques and a historical dataset of labelled Access Point HTTP service response features collected. The method is useful to detect benign or malicious classes, to assess the potential trustworthiness, to detect any type of bad behavior of an HTTP server, and any other threats that modify or implement an AP HTTP server or webpage. The method takes advantage of the captive portal detection packet exchange between a station and an Access Point (AP) to passively classify the AP.

20 Claims, 4 Drawing Sheets

METHOD FOR HTTP-BASED ACCESS POINT FINGERPRINT AND CLASSIFICATION USING MACHINE LEARNING

CROSS-REFERENCE TO RELATED APPLICATION(S)

This application is based on and claims priority under 35 U.S.C. § 119 to Brazilian Patent Application No. 10 2020 003104 0, filed on Feb. 13, 2020, in the Brazilian Intellectual Property Office, the disclosure of which is incorporated by reference herein in its entirety.

TECHNICAL FIELD

The present invention is related to wireless communications field. More specifically, it describes a technique to passively fingerprint and classify Access Point (AP) based on HTTP information, at the moment a device connects to the Access Point (AP), using machine-learning.

BACKGROUND OF THE INVENTION

Wireless communications became indispensable in any smart electronic device, as from the advent of IEEE 802.11 protocol family. Most of wireless devices, such as smartphones, laptops, IoT devices, Smart TVs, are already designed to be connected to Internet in most of time for better functionality and rely in web-based API (application programming interface) to improve user-based or service-based communications. Consequently, device users often search for public wireless Access Points for granting Internet access for their devices, mainly if they are travelling in foreign environment. Advances in device technologies made possible to easily set up an Access Point through software-based solutions, such as Hotspot or Wi-Fi direct, or using a complementary Access Point antenna-device (e.g. USB Wi-Fi dongle).

On the other hand, the technological easiness paved the way for attackers deploy malicious Access Point to perform attacks against those devices in any place. In such context, attackers may target public areas, specific companies, or a specific person, just by changing the AP SSID to the name of target entity, to a known AP, or to a bait custom name such as "Free Internet Wi-Fi", to induce victims connect their devices to the AP. Once connected to a malicious AP, a device is subject to a sort of attacks, such as eavesdropping, SSL strip, fake DNS, redirection to malicious website, credential stealing (Phishing), download of malicious content, cryptocurrency mining among others.

Therefore, solutions that enable a better understanding of characteristics of Access Points, such as detecting application-layer attacks, or identifying a malicious behavior from such APs are necessary.

The term "access point" is used herein to refer to a wireless communicating device that enables client devices to have access to a network. Example of access points include but are not limited to wireless routers, switches, smartphones, printers, among others. The term "access point characteristic" is used herein to refer to a property from the access point in which its clients desire to detect for security purposes or not. Examples of access point HTTP server characteristics include but are not limited to: if the AP is benign or malicious, the trustworthiness probability of the AP, the network configuration of the AP (e.g. if HTTP server is behind a proxy), the software tool, which implements the AP HTTP server including its version, the underlying AP physical device (e.g. router, printer, camera, Smart TV, smartphone among others), the AP infrastructure facility (e.g. airport, shopping, hotel, enterprise among others), if the AP is performing an attack to user such as SSL strip, fake DNS, redirection to malicious website, malicious captive portal, credential stealing (Phishing), download of malicious content, cryptocurrency mining, or any other attack that modifies or implement an HTTP service.

The term "wireless-based communication device" is used herein to refer to a device that connects to an access point via wireless communication link. Therefore, in a typical scenario, the present invention is executed in the wireless-based communication device to detect the access point HTTP server characteristics on the moment a connection is established. Examples of wireless-based communication device include but are not limited to Smartphones, Notebooks, Smart TVs, Smartwatches, Cameras, Routers, Security appliances, among others.

The term "feature" is used herein to refer to a property extracted from an HTTP response packet responded by an access point when requested by an HTTP request packet. The feature may be extracted directly from the property included in the AP HTTP response, or extracted by the processing of different properties in the AP HTTP response. For example, the HTTP protocol response header contains a set of fields within an HTTP message, wherein a feature will represent the existence of a specific field in such HTTP header. As another example, a feature may also represent the existence of a specific information in the value of a field in HTTP response header, for instance but not limited to the existence of strings of substrings in the field values. As another example, a feature may represent the order of two fields when both are present in the HTTP field. A feature may also represent if a specific field name is on lower case or upper case, the number of field values of a field name, as it may contain more than one field value, the number of words a field value has, the number of characters a field value has, the number of specific character in a field value, or the total length of the header and the body. A feature may be extracted from the HTTP content, which consists in HTML data. In such case, a feature may represent the existence or the number of specific HTML tags in HTTP content, the existence and number of specific attributes of HTML tags, the number of HTML comment marks, the total number of HTML tags, the existence and the number of specific keywords in the HTTP content, the existence or the number of external content loads, the existence or the number of media file loads, or the existence or number of words in a text inside an HTML tag.

The term "classifier" is used herein to refer to a machine learning algorithm that classifies an input into a class. The class refers to a group of given examples that presents the same properties. For example, a classifier may label an input as either malicious or benign, in such a case the property is whether the AP is performing a malicious activity or benign activity. As another example, a classifier may label an input into to the class of AP infrastructure facility, such as Hotel, Airport, Store, Shopping, Hospital, or the AP device type 'Printers, Cameras, IoT devices, Router, Smartphone'. The only constraint for the classification task is that the AP contains or redirect to an HTTP server that is reachable in the network by the wireless communication device, and therefore generates an HTTP response packet.

The term "recognizer" is used herein to refer to any machine-learning algorithm that recognizes an input as a known type of AP, AP class, or AP category, from a set of possible existing options. By defining a score threshold, a recognizer is also able to classify an element as unknown AP, which represents a new AP, type of AP, or category of AP from the existing options. Recognizers may also be considered as classifiers with a broader set of class and higher granularity of classification, and thus both terms are interchangeable.

The term "model" may be used herein as a synonym for "classifier" and refers to any machine-learning model suitable for classification problem, and thus both terms are interchangeable.

The term "HTTP server" is used herein to refer to the device or machine that contains the service that enables the HTTP protocol responses for the Access Point.

The term "Captive Portal" is used herein to refer to the portal webpage that appears in user premise delivered by an AP when they connect to the AP from a wireless communication device, before AP enables Internet connectivity.

The term "redirect chain" is used herein to refer to the sequence of HTTP packets that occurs when a redirect instruction is present in the HTTP header or content of an HTTP response, and it triggers another request by the HTTP client. This process may be repeated until a packet with no redirect instruction is responded by the HTTP server, which determines the end of a redirect chain.

The term "dataset" is used herein to refers to a historical set of AP features previous extracted from packet exchanges between access point and a wireless device. Each classification model may have its own dataset, according to the respective existence of features to be used in such model.

Currently, mostly of network communication performed by portable devices relies on the HTTP protocol. Therefore, one characteristic of most Access Points is the presence of an HTTP server. In a benign Access Point, an HTTP server are mainly used for providing a Web API that allows users to configure the AP or for delivering a captive portal webpage, which is displayed to the user in public Access Points before Internet access is granted. In a malicious Access Point, an HTTP server may perform any of the aforementioned application-layer attacks. Because stablishing a connection directly with an AP is not protected by any Intrusion Detection System or Firewall that may exists in the network, device users are unable to identify this type of attacks by default. Moreover, cloud-assisted solutions are not possible due to the lack of Internet connectivity when some of these attacks are executed. Consequently, attacks, such as credential stealing, have become a common practice nowadays.

Current existing technologies and market solutions are still not able to perform Access Point classification based on Access Point HTTP server information on an end-device. Therefore, client devices may be exposed to a variety of threats performed by AP that are only detected at the application-layer analysis, such as Phishing attacks, and lack of better understanding regarding the AP webserver behavior.

Nonetheless, some solutions improve user security regarding the AP that the user device connects to and perform Web Server classification out of context of Access Points.

A known prior art solution is "Huawei WAF" that provides a Web Application Firewall (WAF) in the cloud. The "Huawei WAF" is able to keep an HTTP server secure by examining HTTP traffic and identifying malicious HTTP requests. "Huawei WAF" is also able to detect malicious webpages and other web threats within a deep analysis in the cloud. "Huawei WAF" is a paid service. While WAF aims to protect the server from malicious client requests, the present invention is able to protect the user against malicious Server responses, with no Internet access, to classify HTTP responses.

Another known prior art solution is "Cisco AnyConnect Secure Mobility Client" that provides network protection using a modular software deployed on end-devices. The modules include a Virtual Private Network (VPN) system, DNS-Layer protection, cloud-assisted Web security among others. Using VPN client improves security for untrusted networks, however, it increases user network latency, while user privacy is delegated to third-party. Besides, "Cisco AnyConnect" is a paid service. While both have objectives to protect user device against malicious AP, present invention aims to classify the AP before user interacts with it. Moreover, web-based security provided by "Cisco AnyConnect" demands Internet Access and the processing is delegated to the cloud, while the present invention can be executed before the user has granted Internet Access.

"Avast 2019" is a known solution that uses Artificial Intelligence (AI) to provide enhanced detection of phishing websites by automatically checking a site's URL for suspicious tokens, domain meta-information, and inspecting the visual aspects of sites. Avast 2019 is able to run on an end-device such as a smartphone to collect data, however, the data processing is performed in the cloud. Differently, the present invention is able to perform all processing in an end-device, as it only needs to classify the AP HTTP response it connects to, thus, being lightweight.

"Forcepoint ThreatSeeker Intelligence" is a prior solution that provides content-aware web security reputation intelligence that enables customers to manage access to suspicious websites. Besides URL analysis, "Forcepoint" extends protection using DNS and Suspicious Content analysis. Said solution analyzes all data in a private cloud. While "Forcepoint ThreatSeeker Intelligence" solution aims to analyze HTTP traffic between a client and server in Web, the solution provided by the present inventors aims to classify only HTTP response of an Access Point to assess its legitimacy, and thus are lightweight, and able to be executed on an end-device with no Internet connectivity.

Another known approach is "Tenable" that uses HMAP Web Server Fingerprinting to identify HTTP server implementations. Said solution was able to identify the remote web server type by sending several valid and invalid HTTP requests. In some cases, its version can also be approximated, as well as other properties. Said solution can be executed in an end-device. In contrast with the present invention, HMAP employs multiple forged packet to determine server validation, while the present application solution can be executed passively during the beginning of an AP connection authentication. Moreover, HTTP server fingerprinting can also be achieved in the present invention by sending only one HTTP request. While said solution aims to identify only the software implementation, the solution of the present invention detects AP characteristics using machine-learning techniques on both header and the content of an HTTP packet response, which may be source of different attacks and also provide important data for AP categorization.

"Zvelo" is another prior art solution that provides comprehensive URL categorization and malicious detection solutions for web content, traffic, and connected devices. For URL categorization. "Zvelo" uses a database located in the cloud. Before connection, the URL is sent to a cloud for categorization. Even if the verification could be fast, the process is performed in "Zvelo" cloud. The present invention runs in the end-device without affecting system performance.

"Wappalyzer", known solution for the technical problem envisaged by the present invention, performs HTTP server classification, employing various fingerprinting methods to identify web technologies. HTTP information gathering is similar to Tenable HMAP, but techniques employed, and objectives are different.

The patent Document CN106454847 (A), entitled: "Method and device for detecting phishing risk of public WiFi", published on Feb. 22, 2017, claims a method for inferring Access Point Phishing risk based on analysis of media access control (MAC) address consistency from a previous stored database containing MAC addresses. Storing and maintaining a database could be costly and inefficient.

The patent Document CN106330935 (A), entitled: "Phishing Wi-Fi detection method", published on Jan. 11, 2017, defines a procedure of AP classification, which aims to detect exclusively phishing. Analysis is based on Wi-Fi router physical address, SSID, encryption method, signal strength, MAC address, longitude of the access device, the access device dimensions, the data acquisition time stamp. Also, according to the teachings of said document, gathered information is sent from the AP to the cloud, to classify it externally.

The patent Document CN107896372 (A), entitled: "Phishing hotspot detection method and device and router", published on Apr. 10, 2018, describes a phishing detection technique, which is based whether or not the hotspot is in a white list of APs on a specific area defined by local parameters.

The patent Document US20090307775 (A1), entitled: "Identifying fraudulent activities and the perpetrators thereof", published on Dec. 10, 2009, describes a technique for analyzing if a client HTTP header was previously been associated with a client account. Said solution is to be implemented in server-side to fingerprint HTTP client requests.

The patent Document U520120291129 (A1), entitled: "Detecting web browser-based attacks using browser digest compute tests launched from a remote source", published on Nov. 15, 2012, describes a technique for analyzing the changes in the HTTP response and request content to detect web-browser attacks.

The patent Document US 20100036749 (A1), entitled: "Online Machine Data Collection and Archiving Process", published on Feb. 11, 2010, uses HTTP header for generate a user profile of clients using information such as IP address, HTTP header, and cookie information.

The patent US20120311027, entitled: "Client application fingerprinting based on analysis of client requests", published on Dec. 6, 2012, claims a method for fingerprinting client HTTP requests, by using a string-based encoder for HTTP fields of the requests.

The patent Document US20140101764 (A1), entitled: "Methods and apparatus to detect risks using application layer protocol headers", published on Apr. 10, 2014, claims a method to identify if an HTTP request is malware based on the score threshold manually set for HTTP field information.

The patent U.S. Ser. No. 10/165,004 (B1), entitled: "Passive detection of forged web browsers", published on Dec. 25, 2018, claims a passive detection of forged web client system. Technique uses HTTP header fields to exclusively identify client browsers based on HTTP client requests.

The U.S. Pat. No. 8,307,099 (B1), entitled: "Identifying use of software applications" published on Jun. 11, 2012, claims a method to identify user software by fingerprinting. Their claims 3 and 7 uses HTTP fields as features for fingerprinting client software.

Prior art solutions stand apart of current invention on objectives, scope and techniques, due to one or a combination of the following gaps: are cloud-assisted and depend of Internet access to be executed; are designed to run in server-side to fingerprint HTTP client requests instead of fingerprint HTTP server responses on client-side; do not perform Access Point fingerprint or classification; are not stealthy over the network; are not lightweight to be embedded in energy-constrained devices; do not protect end-user from malicious Access Points. To overcome prior art security gaps, the current invention proposes an HTTP-based classification of Access Point characteristics using Machine-learning to be executed at client-side in user device. The present solution is designed to be passive and stealth by making advantage of a sequence of network events, the captive portal detection, which occurs by default on most of devices when a device connects to a Public AP. When convenient, however, this technique can be actively triggered from any device at any time as it remains connected to an AP, even if the captive portal event does not occur. In such case, invention remains stealth as it disguises as a captive portal detection event. The present invention is also lightweight, as it is able to classify an AP by using only one HTTP packet response, and thus feasible to be embedded in energy-constrained devices, such as wearable and IoT devices. Therefore, the present invention improves known solution on AP classification, as it takes advantages of HTTP packet exchange that occurs in the network, when a user device connects to an Access Point to perform AP fingerprint and classification. Furthermore, an extraction of HTTP response features is done from different parts of an AP HTTP packet response, to be classified by a combination of machine-learning models customized for different purposes, which allows the discovery of previously undetected patterns to classify Access Point characteristics.

SUMMARY

The current invention relates to a technique based on Machine-learning to fingerprint and classify Access Points (AP), using HyperText Transfer Protocol (HTTP) information. Fingerprint and classify Access Points are useful for many purposes, such as to detect if the AP is benign or malicious, to assess the potential risk or trustworthiness of an AP to the user, to detect AP type (printers, IoT devices, cameras, router, Smart TVs etc.), to detect AP infrastructure facility (Airport, Shopping, Enterprise etc.), to infer an AP web-service software type and version, to detect if AP is software-based or hardware-based, to detect AP running services, to detect AP network configuration (e.g. if it is behind a Proxy), to detect specific malicious tools that are used by attackers to emulate an AP, to detect Fake AP attack, Phishing attacks, Evil Twin Attacks, and any other threats that modify or implement an AP HTTP server or webpage. The proposed technique is stealth, since it makes advantage of the captive portal detection packet exchange between a station and an Access Point to passively classify the AP.

The present invention comprises extracting information from HTTP response packets that are transmitted by the AP when device performs an HTTP request. Then, extracted information is used to perform an HTTP-based classification of the Access Point regarding different objectives. Classification objectives include:

- to distinguish between benign or malicious AP;
- to assess the potential risk or trustworthiness of an AP to the user;
- to fingerprint among different AP web-service software (including the software version);
- to detect running services in the AP HTTP server;
- to detect network configuration (e.g. if HTTP server is behind a Proxy);
- to detect the underlying physical device of the AP (e.g. printer, IoT device, wearables, cameras, Smart TVs etc.);
- to detect the physical infrastructure facility of the AP (e.g: Airport, Shopping, Hotel, Enterprise etc.);
- to detect malicious tools that are used by attackers to emulate an AP;
- to detect Fake AP attack;
- to detect Phishing attacks;
- to detect Evil Twin Attacks;
- to detect any other attack or software with characteristics that modify or implement an AP HTTP server or webpage.

The technique proposed by the present invention is stealth, since it makes advantage of the captive portal detection packet exchange between a station and an Access Point to passively classify the AP. The present invention begins with a captive portal detection packet exchange event, which occurs when a station connects to an AP and is checking Internet connectivity of the AP to verify if AP contains a captive portal. Internet connectivity is verified by sending an HTTP request packet (usually a request with code 204) to a known IP domain, in which response is known and comparing the AP response with the expected response (usually a "no content" packet). In general, if response is different from expected, devices trigger captive portal and display a webpage that is delivered by the Access Point to the user. The present invention is executed passively during the beginning of the AP connection. However, it can be executed actively at any time the device remains connected by sending a specific request HTTP packet that will trigger an HTTP response from the AP. In case a captive portal is not detected in AP, an HTTP request can be sent directly to the gateway IP of the AP to obtain a response from the AP gateway HTTP server.

Triggered by a captive portal detection event or actively executed by sending an HTTP request, the technique of present invention consists in extracting features from the header and the body of the AP HTTP responses, including but not limited to the presence of HTTP fields, presence of strings in HTTP field values, order of HTTP fields, number of substrings in HTTP field values, presence of specific HTML tags in HTTP content, presence of strings in HTTP content, counters of specific HTML tags in HTTP content, length of HTTP header, length of HTTP content, number of words, specific words, and specific word categories in displayed text to user, among others. Then, the extracted features are used as input for machine-learning classifier models, which were previously trained and tailored for a selected classification objective. A classification objective may be classifying between malicious and benign, AP type (printer, router, cameras, IoT devices), AP infrastructure facility (airport, hotel, shopping etc.), AP HTTP implementation software, if its AP has a specific application-layer attack or not (e.g. it contains Phishing), among others.

As packet exchange may contain multiple packet responses when an HTTP redirect chain occurs, many models can be applied simultaneously, one tailored for each packet considering its respective order in the redirect chain. Since HTTP headers can vary during the redirect chain, a policy can be applied such that HTTP header model is invoked again if different headers are noted. The number of redirects in the chain and the variation of HTTP headers can also be used as features for classification models. Therefore, a combination of different machine learning models can be used to classify AP HTTP server among the range of possible classification objectives.

As the captive portal detection packet exchange occurs instantly after a station connects to the AP, user will classify or fingerprint AP instantly after connection and different actions regarding classification result can be taken. For instance, if an AP is classified as malicious, user might want to disconnect from it.

To direct a given classification objective, a ground-truth dataset of labeled instances of previous HTTP packets exchanged is required for training the machine-learning models to address the classification task. Once models are generated in an off-line training process, they can be deployed into any wireless communication device using any programming language.

For example, a tree-based model would be programmed as a set of if-then-else statement in a tree format, while a neural-network model as a matrix multiplication format. Machine-learning model selection and design should take into account the end-device constraints and the classification objective of the problem to be addressed. Therefore, the present invention is designed to be agnostic of the underlying machine-learning model and classification objective of the Access Point, and do not impose any restrictions to it.

The method of the present invention can be applied to the majority of electronic products, such as smartphones, Smart TVs, laptops, Tablets among other wireless communication devices. In addition, no hardware changes are required for the fingerprinting and classification tasks. The invention is also lightweight and can be embedded in resource constrained devices, such as wearable and IoT devices, with little or no battery impact.

BRIEF DESCRIPTION OF DRAWINGS

The objectives and advantages of the current invention will become clearer through the following detailed description of the example and non-limitative drawings presented at the end of this document.

DETAILED DESCRIPTION

New Features of Invention

Figure 1:
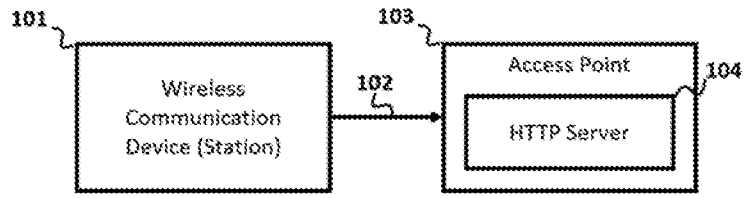
FIG. 1 discloses the invention first typical application scenario.

Most advanced existing technologies for HTTP-based classification rely in assistance by cloud technologies to classify network HTTP services. This approach is not possible, however, when a device establishes a connection with an Access Point, which may lack of Internet connectivity. For example, if an AP contains captive portal authentication, it will limit connectivity before user perform some action, such as entering user credentials. Furthermore, such techniques also classify an HTTP server by actively probing the HTTP server from the client sending multiple HTTP packet requests, as few packets do not leverage enough information to accurately classify the HTTP service. Therefore, there is a lack of solutions that classify HTTP data with no cloud assistance, and at the same time, are accurate, stealth and suitable to resource-restrained devices.

To address this issue, the present invention takes advantages of a sequence of network events that occurs at the beginning of a connection establishment from a Wireless Communication Device to an Access Point and combines novel information extraction from an HTTP packet response to classify an Access Point, using off-line machine-learning techniques.

Using information from different events in the network, present invention combines individual machine-learning models with different learning purposes, such as HTTP implementation fingerprint, anomaly detection of HTTP content, recognition of HTML data structure patterns and text classification using Natural Language Processing of the displayed text to user, to output a reliable classification result of the AP.

The combination of machine-learning models with different purposes are able to detect patterns in data previously undetected by prior art approaches, and enhances capability to detect malicious attacks or to perform AP categorization.

Furthermore, the present invention also proposes a feature set for HTTP classification.

Regarding security field, the existent security solutions for wireless-enabled devices are not able to obtain meaningful characteristics of attacks performed by an Access Point against a Wireless Communication Device. Therefore, devices are exposed to a broad range of attacks, as detection techniques lack a better understanding about the AP behavior. Consequently, the present invention tackles the security gap by detecting an AP that performs web-based attacks to user, such as Phishing. Such detection is possible because present invention enables security solutions to obtain a wider range of AP characteristics just after connection is established with the AP while no Internet Access have been provided.

To achieve such goal, the present invention passively classifies and recognizes access points (AP) characteristics by using information from HTTP messages that are already transmitted right after a connection is established between a Wireless Communication Device and an Access Point.

Moreover, present invention enriches features with information gathered from different parts of an HTTP packet exchange, and combines models with different properties and objectives, which when combined, enhances reliability of final classification result. Hence, user may take an action before having its device compromised.

Therefore, present invention provides a better evaluation of the characteristics of the AP regarding trustworthiness, and improves user security. When using the present invention, any electronic device will be able to detect a wider range of malicious AP and attacks performed by APs, as well as to detect other AP characteristics to be used for other solutions. Hence, this invention makes important progress in the market, as it can be readily used in current and future electronic device products without any hardware changes, and with small computational resource demands.

Advantages of the Invention

Based on the problems found in the closest existing technologies, the following advantages of present invention are presented:

Considering classification coverage, present invention has the capability to classify an Access Point regarding different objectives, but not limited to, if the AP is benign or malicious,
  to assess the potential risk or trustworthiness of an AP to the user;
  to infer an AP web-service software type and version;
  to detect running services on the AP;
  to detect network configuration (e.g. if it is behind a Proxy);
  to detect specific malicious tools that are used by attackers to emulate an AP;
  to detect Fake AP, Phishing attacks, malicious captive portals, web-based attacks, or any attack that modify or implement an AP HTTP server or its delivery content;
  to detect the underlying physical device of the AP (e.g. printer, IoT device, wearables, cameras, Smart TVs etc.), and any other classification objective that its classes present differences in traces or patterns of HTTP data.
The present invention can be executed passively by using the information of a connectivity check event, as most of current Wi-Fi devices perform connectivity check to check if AP is using a captive portal when they first connect to an AP;
The present invention can also be executed actively with minimum impact on the network, by sending just one HTTP packet request to the Access Point. In addition, the one packet request may be dissimulated as a connectivity-check event;
The present invention has high resiliency against adversarial attacks, as it combines different models that rely on different sources of information and type of features, which are extracted from a sequence of network events at the moment a Wi-Fi device connects to an AP;
The present invention does not require hardware changes for the fingerprinting and classification tasks.
The present invention is lightweight and suitable to be embedded in resource constrained devices, such as wearable and IoT devices, with little or no battery impact.
The present invention can be applied to various electronic devices, such as smartphones, Smart TVs, laptops, Tablets among other wireless communication devices.
The present invention may be use in different Access Point classification objectives, including to protect user security.
The present method that combines different data source extraction of HTTP responses are not restricted to Access Point and Wireless Communications field and may be used in any machine or device that provides an HTTP service.

The present invention is applicable for universal-scale usage, as HTTP is the foundation for data communication in World Wide Web.

Disadvantages of the Invention

As an intrinsic limitation of machine-learning solutions, the invention might be subjected to adversarial attacks. For example, if an attacker obtains knowledge regarding which information in being used by the classifier, the attacker might change behavior. However, this task can be made very hard for an attacker due to the combination of multiple machine-learning models, which are trained with different source of information and objectives.

An adversarial attack that is simultaneously effective against the fingerprint model, the web page structure model and the text information model is unlikely to occur. For example, an attacker might change the HTML structure of a webpage to disguise webpage inconsistencies, but HTTP header fields, that are used to fingerprint the HTTP software tool, will be unlikely changed. Also, in case of Phishing attack, one characteristic may be the existence of text sentences to convince user to take a bait action. Thus, if the attacker manages to change both HTTP software implementation and HTML webpage structure models, the text-based characteristics would still be recognized by NLP model. Moreover, as the present invention provides a passive method to classify the AP, the attacker is less likely to get any knowledge of the classifier and the extracted features.

Other limitation of invention may be use of a Natural Language Processing (NLP) model, which may demand more processing depending of the size of text message. However, different manners to overcome this limitation are possible. First, the bag of words of NLP model may be pruned to reduce processing and memory needs. Second, a threshold of text size may be set prior text feature extraction and classification. Other includes classifying only a sample fraction of the text, instead of the entire message. Moreover, as both HTTP header and HTTP content models are lightweight and suitable to be employed in most of resource-constrained devices, and because NLP model is a complementary model to enhance AP classification result, the present invention may deactivate NLP classification model when convenient, without compromising AP classification.

The drawings will be described in detail with mention to the reference numbers in them whenever as possible. The specific examples mentioned throughout the specification are used only for clarification purposes and are not intended to limit the applicability of the present invention.

The present invention extracts information from the HTTP protocol messages transmitted between a Wireless Communication Device and an Access Point immediately after they establish authentication. By inspecting data from the header and the body of HTTP protocol messages, different machine-learning classifiers tailored for different learning purposes are applied. The combination of machine learning models is used to detect different AP characteristics, such as the reliability of the AP to the user. Technique may be performed passively, by analyzing the network events that occurs in the network, such as the captive portal detection, or actively, by send a single HTTP request packet to the AP. The present invention may only use the first HTTP response packet for classification. In this scenario, the present invention may use one machine-learning up to three machine-learning models for classification. However, an HTTP packet response may incur an HTTP redirect chain and more packets would be exchanged between client and AP.

In that scenario, if the next HTTP packet transmitted are not HTTPS, more models may be applied for each next packet response. A unique model may be trained for all packets, or each model may have a model tailored for the packet considering its order in the HTTP redirect chain.

Finally, the final decision of the classification may use the output for each model combined, separated by weights or not, and tailored with model-specific threshold values or not. For example, if the HTTP header fingerprint model had a strong result weight, its classification output has more impact in the final decision, and the use of other models would not be necessary for that case.

Regarding feature extraction, the present invention may separate features into groups to be used exclusively for a machine learning model, or a combination of models, but also may use all features in a unique feature vector to be used by all classifiers. Three main groups of features are defined, which includes:

i) features from the HTTP response header, aimed to extract information of the HTTP server implementation for recognition and fingerprint purposes, which may represent but are not limited to the presence of an HTTP header field, the existence of fields that are unknown for the classifier, the value of the fields, if a field value belongs to a class of values, and patterns of strings or characters existent in field values;

ii) features from the HTTP response body, aimed to detect patterns regarding the HTML data, structure and webpage consistency, which may represent but are not limited to the existence or quantity of patterns in HTML elements, HTML tags, HTML tag attributes, restricting to an HTML tag context or not; and iii) features from the user-displayed text of HTTP response content, aimed to extract valuable knowledge of the text which is displayed to user in user device browser, which may represent but are not limited to quantity of number of words, word categories, word groups, word sequences, from a specific set of words or not, restricted to a specific HTML tag context or not.

The present invention may be applied to many classification objectives, including binary and multiclass problems.

By tailoring the training phase with the correct labeled dataset, the models can be suitable for classifying between benign or malicious access points, to assess the potential risk or trustworthiness of an AP to the user, to classify among different AP web-service software types (even the version), to detect running services in the HTTP server, to detect network configuration (e.g. if it is behind a Proxy), to detect the underlying physical device of the AP (e.g. printers, IoT devices, Wearables, cameras, laptops, Smart TVs, smartphones etc.), to detect Fake AP attack, to detect Phishing attacks, to detect any other attack or software that have characteristics that modify or implement an AP HTTP server. Moreover, for the last packet in a redirect chain (which is also the first in case of only one packet), an additional machine-learning model specialized in natural language processing can be used to classify the final text which is rendered and displayed to the user. This is particularly useful in different classification problems, such as detecting Phishing attacks, detecting type of AP facility (e.g. Hotel, Airport, Telecom Operator) that user connects to and also the device type (Printers, Cameras etc.) through semantic and syntax text analysis.

Furthermore, this technique is not necessarily restricted to captive portal HTTP servers, but also any HTTP server from a network gateway that client is connected to, such as an AP HTTP server used as web interface to configure the AP. The technique takes advantage of the captive portal detection to become passive, due to the default captive portal process that sends an HTTP packet to a web domain which a known response is expected (usual packet with code 204 is sent expecting a 'no content' response). However, at any moment in which the device is connected to an AP, technique can be invoked actively by resending a 204-code packet to a domain IP that its response is known. If user receives the expected content, it means, that the AP did not intercept the packet to its own server. An AP may be configured to intercept the packet and redirect the HTTP request to an external HTTP server, however, it does not affect classification as the AP is still delivering the response to user. In that case, AP will inherit properties of the external HTTP server. However, at any time, a device can send the packet directly to the gateway IP to force classification of current AP HTTP server if it exists. A captive portal server and AP gateway configuration server may be hosted at the same device using different HTTP services, and therefore, each response will be classified according to its origin and objectives.

Therefore, to optimize results, models can be trained with dataset of gateway HTTP servers to tailor classification of APs gateways or trained with a dataset of captive portal HTTP servers to tailor classification of captive portal servers. Therefore, dataset of features from the HTTP header may have different volume of data from a dataset of the HTML content of the packets. Also, the first packet response may contain more instances in a dataset than the third packet response, as some APs may have only one packet response, or packet responses after the first response may be cryptographically secured. Moreover, not all models would be suitable for an AP. For example, if an HTTP packet response have no HTML content, then, only the HTTP classification model will be applied.

FIG. 1 shows the first typical scenario of the present invention. In this scenario, a Wireless Communication Device (101), also referred as Station, establishes a network connection (102) to an Access Point device (103). The network connection (102) is any type of communication link using a common shared protocol, such as the IEEE 802.11 protocol family, i.e. 802.11a/b/g/n/ac/ax among others.

After the network connection (102) is established, the wireless communication device shares the same network with the Access Point, and the Access Point is the network gateway for the wireless communication device. In this scenario, the Access Point contains an HTTP server (104), also referred as web server. The HTTP server may store, process or deliver webpages to network clients when requested via HTTP request packets.

An example of webpage delivered by Access Points are the Captive Portal webpage, the Router Configuration webpage, a default page of an HTTP server, or any other webpage.

Figure 2:
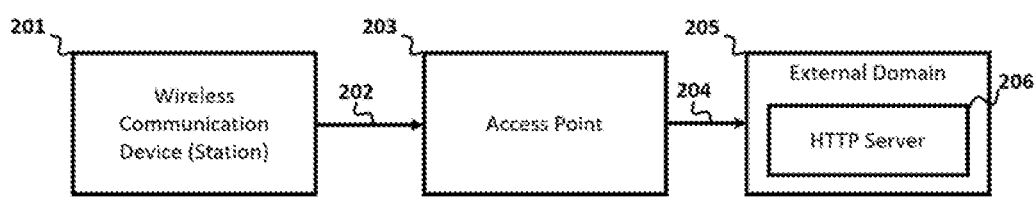
FIG. 2 discloses the invention second typical application scenario.

FIG. 2 shows a second typical scenario of the present invention. In this scenario, a Wireless Communication Device (201), or Station, also establishes a network connection (202) to an Access Point device (203), similar to FIG. 1.

The network connection (202) is any type of communication link using a common shared protocol. After the network connection is established, the wireless communication device and the Access Point shares the same network. In this scenario, an external server (205) is connected to the Access Point via the same shared network, via a second LAN network, via Internet connection, or any other type of network connection (204). The external server contains an HTTP server (206) that may store, process or deliver webpages to clients when requested via HTTP request packets. In this scenario, the Access Point may redirect an HTTP request sent by the wireless communication device that is destined to the Access Point IP, or to any other destination, to the HTTP server of external server.

Figure 3:
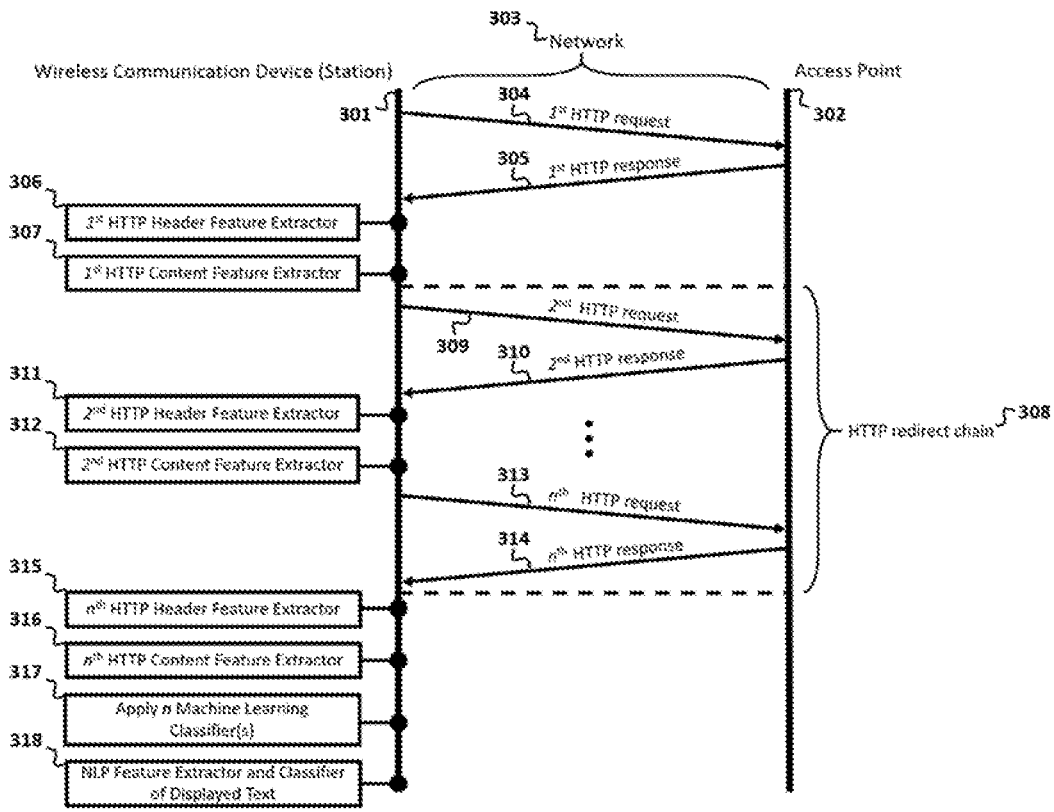
FIG. 3 discloses the present invention high-level events and network flow.

FIG. 3 depicts the network flow and high-level events of the present invention, which occurs with an HTTP packet exchange between the Wireless Communication Device (301) and the Access Point (302). The network flow diagram illustrates the sequence of packets that are exchanged in the network (303), i.e. the network communication link at the application layer, when the present invention is executed. The network packet exchange may represent HTTP packets sent during a Captive Portal detection event, or an HTTP request for a webpage, sent by the Wireless Communication Device to the Access Point IP, or any HTTP request that may be sent from the Wireless Communication Device destined to the Access Point IP. When the first HTTP request is sent by Station (304), the correspondent HTTP response of the Access Point (305) will either be a final HTTP response, by delivering the requested content or by sending a finish HTTP code message, or it will deliver a packet containing an instruction to send a new request to another URL, herein defined as a redirect instruction. Examples of redirect instructions include but are not limited to JavaScript code that loads external webpage, HTML meta tag instruction that refreshes to a secondary webpage, PHP code that redirects the webpage to another, any HTML artifact capable of redirecting the HTML webpage before user interacts with it. A sequence of one or more HTTP response packets with a redirect instruction is herein defined as HTTP redirect chain or redirect chain. Regardless if the first packet response generates or not an HTTP redirect chain, two feature extraction methods would be executed for the first HTTP response. First, an HTTP header feature extractor (306) will convert information from HTTP response header into numerical features, and second, an HTTP content feature extractor (307) will convert information from the HTTP response content, i.e. the HTML content data, into numerical features. If the received first HTTP response invokes new packet request, i.e. starts an HTTP redirect chain (308), then a second HTTP request is performed (309) and a second HTTP response packet (310) is received from the Access Point by the Wireless Communication Device. Then, a second HTTP header feature extractor (311) and HTTP content feature extractor (312) are executed over the second HTTP response packet. These extractors may be configured to extract the same set of features for all HTTP response packets, but are not restricted to.

Depending on the order of a packet in the chain, features might have different impact on the classifier and different features might be selected among feature extractors. This procedure is repeated until a last HTTP request packet (313) is sent and a last HTTP response packet is received (314), i.e. an HTTP response packet with no redirect instruction. Then, the last feature extractors of HTTP header (315) and HTTP content (316) are executed for the last HTTP response packet.

After obtaining HTTP header and content features vectors of all HTTP response packets, the method applies machine-learning models (317) that were previously trained and tailored for each packet in the chain, which may or not take into consideration its respective order in the chain, to the classify the HTTP packet responses. Hereinafter, any combination of model results, weighted by its position in the chain or not, weighted by the classification reliability or not, or both, may be used to obtain a final classification result.

Additionally, a Machine-Learning model that performs Natural Language Processing (318) may be used altogether with its corresponding feature extractor over the displayed text of the last packet content to enhance classification performance. Because the last HTTP response packet from a redirect chain comprises the actual content that is displayed to the Wireless Communication Device user, the NLP extractor and model aim to obtain useful information from semantics and syntax of the displayed text, thus classifying text between different AP class objectives.

Examples of text classification includes, to recognize type of AP infrastructure facility, to detect if webpage is Phishing or not Phishing etc. The ensemble of multiple machine-learning models, which use different source of the data to classify the same instance, strongly enhances the classification capability of proposed method. It is important to note that machine-learning models used herein, which may refer to tree-based, neural-network-based, statistical-based among other learning algorithms, are aimed to be previously trained in off-line, and even the combination of many of them can be lightweight and suitable to be ported to energy-restrained devices.

Figure 4:
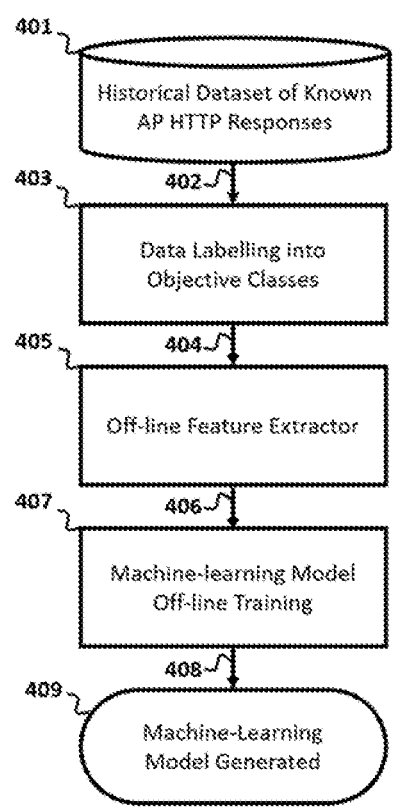
FIG. 4 discloses the workflow of off-line model generation for AP HTTP response classification.

FIG. 4 shows the workflow of off-line machine-learning model generation process. Model generation starts with a historical dataset of AP HTTP responses raw data (401) that may be synthetically generated, environment-controlled generated or collected using invention method if AP class is known. The raw data might be in network dump format, structured or non-structured format, text format, or any file format that contains the necessary information to extract the selected features (402). HTTP response data may or may not contain the information of its respective order on the HTTP redirect chain when packet was captured. If data contain packet order information, it may be used to tailor specific models for each packet respective order, or used as weight function during the final combination of model results. Then, AP HTTP responses are labelled according to the objective of classification model (403). Next, different types of feature extractors will convert all labelled AP response raw data (404) into the numerical features. The feature extraction method (405) includes an HTTP header feature extractor, suitable for all packets, an HTTP content feature extractor which may be used or not depending if packet has sufficient content data, which may defined by an HTML data size threshold, and a NLP feature extractor which will only be executed over the last packet responses of a redirect chain. After feature extraction process, data is now represented as feature vectors (406) which serve as input for off-line model training algorithms (407). Off-line model training algorithms refers to any learning algorithm that may rely on clustering, classification, distance-based or other machine-learning technique, aimed to create a model that generalizes properties and patterns of historical data to apply predictions or classifications on future data. The training process may also include the steps of data cleaning, data cleansing, data filtering, feature selection, feature reduction, normalization, standardization, cross-validation, among other pre-processing and post-processing techniques. The off-line model training process might generate several models with its respective results (408), in which the best model may be selected according to an evaluation criterion. If packet order is considered in the model generation process, input data will be split according to its order to create different machine-learning models corresponding to each specific packet order in the HTTP redirect chain. The final machine-learning models generated (409) may be represented as a binary file, object file, parameter values in case of parametric models, weights, text description, or any type or combination of data files that entirely represent a machine-learning model.

Figure 5:
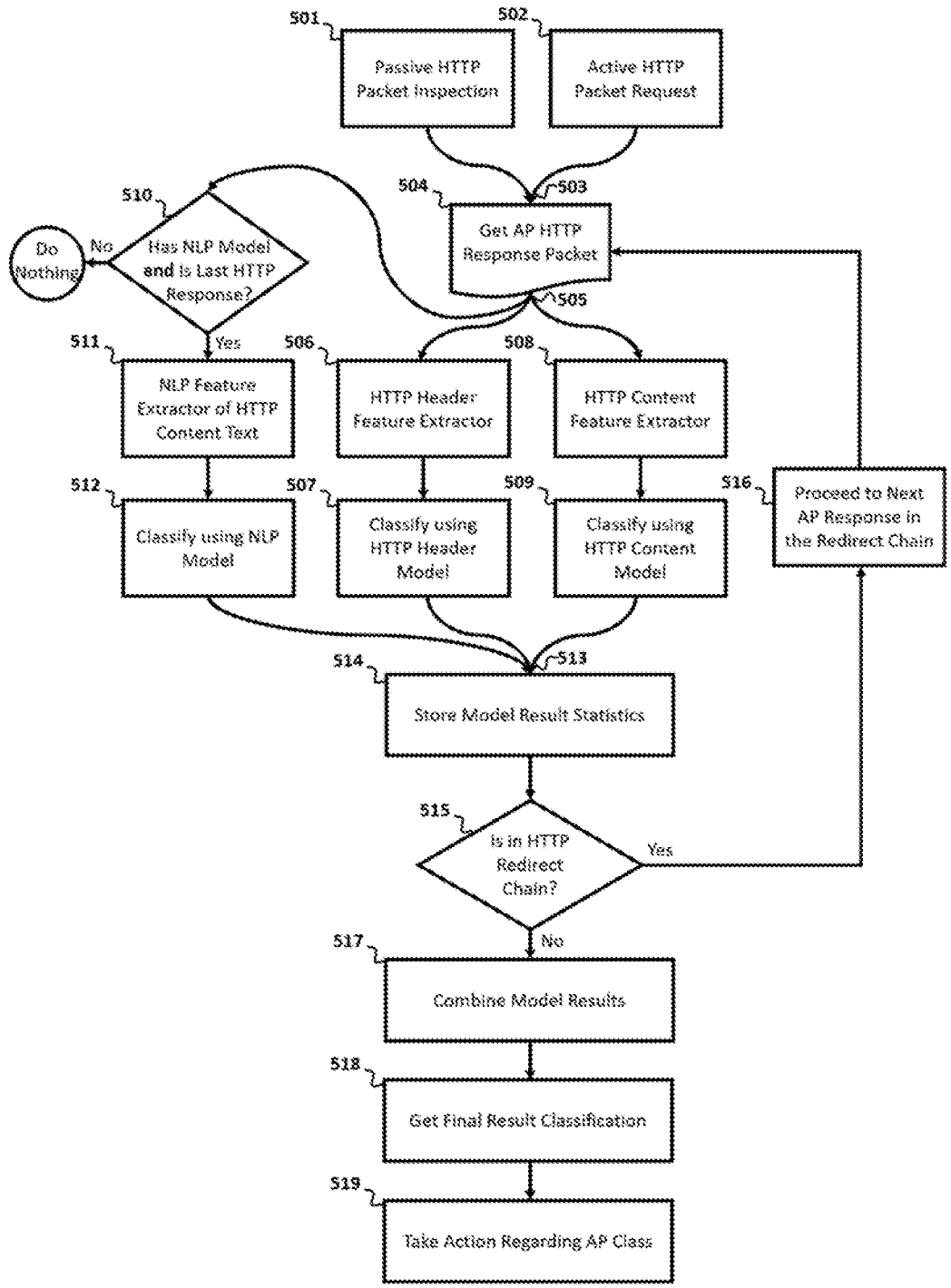
FIG. 5 discloses the present invention classification workflow.

FIG. 5 depicts the present invention classification workflow. The classification method of the invention may be triggered by a captive portal event, in which the Wireless Communication Device relies to check Internet connectivity of an Access Point after establishing connection to it. The captive portal event will passively trigger the proposed method, in which all information from AP will be gathered through inspecting the HTTP response received during the captive portal event (501), either by copying it with privilege access or sniffing the network. As captive portal event relies in sending an unsecure HTTP packet, and not secure HTTPS, packet inspection can be easily performed. In case of AP does not contain a captive portal, the method of the present invention may be triggered actively at any moment the device remains connected to the AP (502) by sending an HTTP packet request destined to the IP of the Access Point or to an External Server in which the HTTP response is known. An example of HTTP request to an External Server, a request with a code 204 may be sent, in which it is expected a response with no content, similar to the captive portal event, and if response is different from expected, it was intercept by the AP and HTTP response can be classified. In case of captive portal data be delivered by the AP using a secure protocol (e.g. HTTPS) over the network, method of present invention should be actively invoked (502) to proper obtain the content of HTTP response. In case AP does not contain an HTTP server or does not redirect HTTP request to an external server, there is no instance to be classified. Therefore, proposed method may be passively triggered at the beginning of an AP connection or actively by send specific HTTP requests at any time (503). With the AP HTTP response packet information (504), feature extractors and classification models suitable for that HTTP response packet are executed (505). First, HTTP Header feature extractor (506) and HTTP Header classifier (507) of first packet are executed. The HTTP header model has the strong capability of recognize and fingerprint HTTP servers based on the software or hardware tool that implements it and is a strong indicator of the AP class.

For instance, to detect if AP is a known malicious software tool that performs Phishing attack. Then, HTTP content feature extractors (508) and HTTP content models (509) are executed, which aim to classify the HTML data of the HTTP content. The HTTP content classifier has a strong capability of detecting quality of webpages, AP type, AP infrastructure facilities, patterns of HTML objects and HTML tags, level of privacy data an AP server will collect from Device, among other patterns of HTML webpages.

By combining both classifier results of the first packet, classification result has greater reliability than only using one classifier. However, if the AP HTTP response incurs in an HTTP redirect chain (515), collecting more AP HTTP responses (516) will enhance even more the reliability of the final classification result of the AP.

Additionally, if method is using an NLP model and the packet is the last packet of a redirect chain (510), an NLP feature extractor (511) and an NLP classification model (512) over the displayed text of last packet may also be used. Using the results of all models (513) that are stored (514)

during method execution, model results can be combined using different strategies (517).

Ensemble strategies may consider weights per model, the respective model order in the chain, probability results of the model, model thresholds, or any other ensemble technique. After combining model results, a final result with stronger classification reliability is achieved (518).

Finally, user may take an action regarding final classification result. One example of action is if models were trained to detect Phishing and final model result classifies AP as a Phishing attack, user may disconnect from the AP (519).

Figure 6:
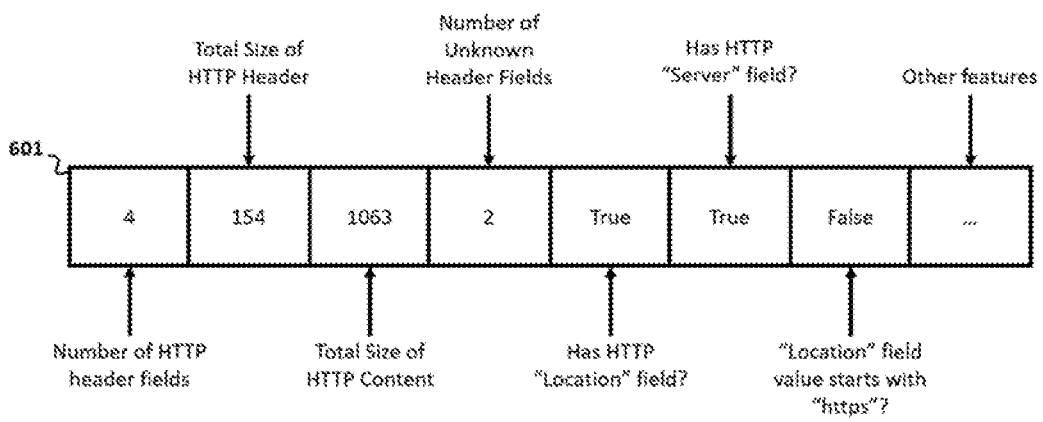
FIG. 6 discloses an example of feature vector extracted from HTTP header.

FIG. 6 shows an example of a feature vector (601) of the HTTP header features. Features extracted from the HTTP response header includes but are not limited to: total number of header fields; total size of HTTP header; total size of HTTP content; binary feature representing the presence of specific header fields (e.g. "Location", "Server", "Cache-control" etc.); order between two or more header fields when they are present (e.g. a binary feature which "True" indicates that "Location" field appears before "Server", or 0 otherwise); binary feature representing if header field names are lower or upper case (e.g. if "LOCATION" is written instead of "Location" field name); binary feature representing the exact match of a header field value with a known value; presence of specific strings in a header field value; presence of specific characters in a header field value; count of specific strings in a header field value; count of specific characters in a header field value; length of a header field value; the numeric value of a header field value; number of words present in a header field value; number of header fields that are unknown by the feature extractor; if a header field value starts with a specific string (e.g. if an field value that contains an URL starts with "https" instead of "http"); if a header field value ends with a specific string; one-hot-encoded features representing the possible values a field header name may have if field has a limited set of available values; one-hot-encoded features representing categories of values a header field name may have if the field value can be categorized into different values (e.g. "Server" field may contains information regarding the server name and server version, but may be categorized only as the server name, or as "unknown" if server name is not recognized as a known category by the feature extractor); if a header field value contains an IP format string; number of top-level domains, domains or subdomains that a header field value in URL format contains (e.g. "http://aaaa.bbb.com/" have 3 domains); number of folders in URL a header field value in URL format contains (e.g. "http://aaa.com/example/bbb/index.php?q=ccc" contains 2 folders 'example' and 'bbb'); any other feature that represents a property of one or a group of different header responses, in which the property can be translated into a numeric value.

Also, features that aim to match the entire, or part of, strings or characters, may be case sensitive or not. In FIG. 6, feature vector comprises different type of features, as described above, in which for Boolean features True represents "1" and False represents "0".

Figure 7:
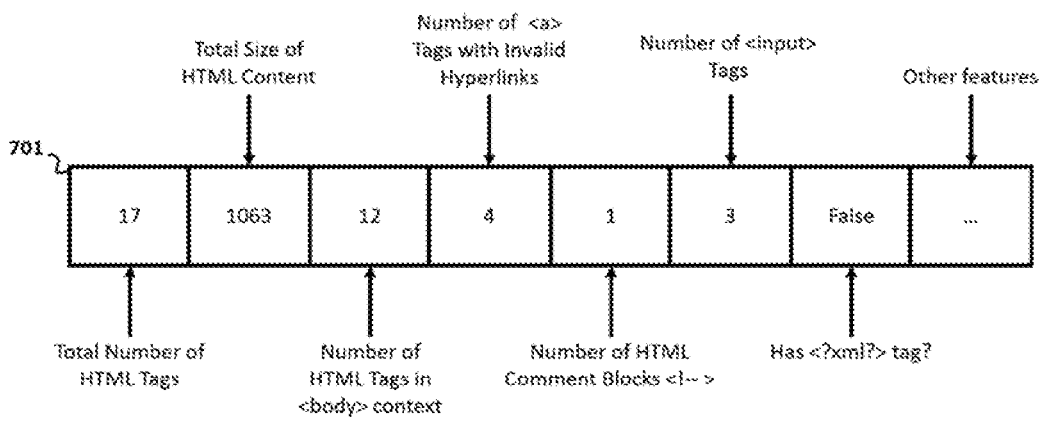
FIG. 7 discloses an example of feature vector extracted from HTTP content.

FIG. 7 shows an example of feature vector (701) extracted from the HTTP content of the HTTP packet response. Features extracted from the HTTP response content includes but are not limited to: presence of specific HTML tags; count the number of HTML tags; count the number of HTML tags inside an HTML tag context; count the number of HTML tags with specific attributes; count the number of a specific HTML tag, in which a specific attribute value matches a specific string; count the number of a specific HTML tag, in which a specific attribute value contains a specific string or character; count the number of a specific HTML tag, in which a specific attribute starts with or ends with a specific string or characters; count the number of occurrences of a specific string, character or sequence of characters appears in a specific attribute value; count the number of specific strings of the displayed text of the HTML data; count the number of times a specific tag has a null or invalid value for a specific attribute; check if a specific HTML tag exists; check if a specific HTML tag with a specific attribute exists; check if a specific HTML tag with a specific attribute and a specific attribute value exists; count the number of HTML comment blocks; count the number of time a specific tag has a valid value for a specific attribute; count the number of time a specific media file is loaded; count the number of times external content is loaded; count the number of patterns in script source; count the number of times that a specific tag has a specific attribute with value corresponding to a specific file extension; check the existence of page redirection instructions in the data; count the number of times a page redirects instruction occurs; count the number of words is present inside a specific tag context; count the number of times a specific pattern that indicate the presence of a specific element in the page occurs; check if a specific tag is on upper case; any other feature that represents a property, the existence of a pattern, or the number of times a pattern occurs in the entire, or part of, the HTTP content, in which the property can be translated into a numeric value; any of the aforementioned features but restricted to a specific HTML tag context instead of the entire HTML data. Herein, tags HTML are defined as HTML elements delimited by a greater-than (<) and less-than (>) symbols (e.g. "<a>" represents the beginning of HTML tag "a", and </a> the end of the HTML tag). An HTML tag context is defined as any content, other HTML tags, or text, placed between the beginning of an HTML tag and the end of the same tag. An HTML tag attribute refers to any property that an HTML tag may contain, defined inside < > symbols (e.g. "href" is an attribute in <a href="#"> tag).

Figure 8:
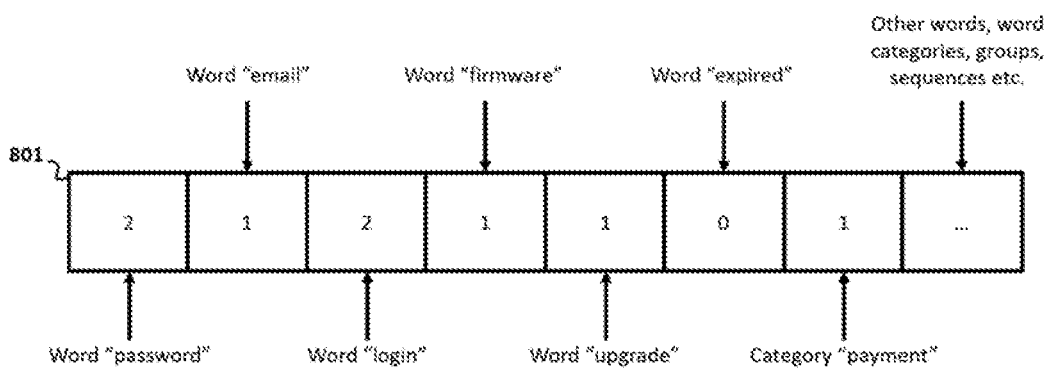
FIG. 8 discloses an example of a NLP feature vector extracted from the displayed text of the last HTTP response content.

FIG. 8 shows an example of feature vector (801) for the NLP classifier. Features extracted by the NLP extractor use information from the displayed text translated into a feature vector in which a NLP model will use to classify the AP. Herein, the displayed text is defined as the text data that is displayed to the user when the HTTP content of the last HTTP response from the AP, i.e. the last webpage that is delivered to the user after an HTTP redirect chain, is rendered in user browser. Word category is defined as a label to a set of words that shares a common property, meaning or any kind of relationship, which may be semantical, syntactical, morphological, or grammatical. The NLP features includes but are not limited to: count the number a specific word appears in the displayed text, in which the bag of words is previously defined; count the number of words per word category, in which the bag of word categories is previously defined; count the number a specific group of words appears altogether in the displayed text; count the number a specific group of words appears altogether in a specific order, but not necessarily in sequence; count the number a specific group of words appears on sequence altogether in a specific order; binary features representing the existence of specific words, word categories, word groups, or word sequences; any other combination of word, word category, or word groups.

Although the present disclosure has been described in connection with certain preferred embodiments, it should be understood that it is not intended to limit the disclosure to those particular embodiments. Rather, it is intended to cover all alternatives, modifications and equivalents possible within the spirit and scope of the disclosure as defined by the appended claims.

What is claimed is:

1. A method for HTTP service fingerprint and classification using machine learning, the method comprising:
    training a HTTP-based machine-learning model, using machine-learning training techniques and a historical dataset of labelled Access Point HTTP service response features collected by a feature extractor module;
    generating the HTTP-based machine-learning model to perform classification of HTTP services;
    collecting, by a collector module, HTTP service response packets from multiple HTTP servers having known classification labels;
    extracting, by the feature extraction module, features from the collected HTTP service response packets;
    labelling the extracted features from the HTTP service response packets, using labels from a set of classes defined according to a classification objective of the HTTP-based machine-learning model;
    selecting a set of features from the labelled HTTP service response packet features, using feature selection techniques, that are the best suitable features to be used in the HTTP-based machine-learning model; and
    classifying to perform classification of HTTP services by:
        using the HTTP-based machine-learning model trained with labelled samples of the selected set of features from the labelled HTTP service response packet features,
    selectively applying a second machine learning model that collects data present inside an HTTP body of the HTTP service response packets, and
    selectively applying a third machine learning model that extracts human readable text information of a page rendered by a user browser.

2. The method of claim 1, wherein the collecting the HTTP response packets comprises:
    passively sniffing a network to obtain the HTTP service redirection response packets; and
    sending the obtained HTTP service redirection response packets to the feature extractor module.

3. The method of claim 1, wherein the collecting the HTTP redirection response packets comprises:
    actively sending an HTTP request to the network gateway;
    receiving the HTTP response packets from the network gateway HTTP server; and
    sending the received HTTP response packets to the feature extractor module.

4. The method of claim 1, wherein the collecting the HTTP redirection response packets comprises:
    actively sending an HTTP request to a known HTTP server that has a known HTTP response behavior;
    receiving the HTTP response packets from the HTTP server;
    comparing the known HTTP server response behavior with the received HTTP server response packets to verify if it consists of a redirection response type; and
    based on the comparing, sending the received HTTP server response packets that present different behavior from the known HTTP response behavior, which implies that the received HTTP response is an HTTP response of redirection type, to the feature extractor module.

5. The method of claim 1, wherein the extracting the features from the collected HTTP redirect response packets comprises:
    extracting the features from a header of the HTTP redirect response packets;
    extracting the features from a body of the HTTP redirect response packets; and
    extracting the features from text data contained in a body of HTTP redirect response packets.

6. The method of claim 5, wherein the extracting the features from the collected HTTP redirect responses further comprises:
    separating the extracted features into sets determined by a feature selection process, to be used in the HTTP-based machine-learning model to receive a specific set of features from the HTTP redirect response packets.

7. The method of claim 1, wherein the classifying comprises:
    classifying, using a plurality of machine-learning models trained with labelled samples of HTTP response, the selected set of features from the HTTP response packet features; and
    combining results of the plurality of machine-learning models trained with labeled samples of HTTP responses, using a model ensemble technique to obtain a final classification result to be used in external solutions to classify HTTP servers.

8. The method of claim 1, wherein the classification model trained with labelled samples of HTTP responses is represented as a binary file, object file, parameter values in case of parametric models, weights, text description, or any type or combination of data files that entirely represent a machine-learning model.

9. The method of claim 1, further comprising recognizing an HTTP server by applying one or multiple machine-learning models, previously trained with labelled samples of HTTP responses, with recognition purposes.

10. The method of claim 8, wherein the recognition purposes include at least one of:
    identifying whether the HTTP Server is a known HTTP server or service;
    identifying whether the HTTP Server belongs to a known class of HTTP server or services.

11. The method of claim 1, further comprising identifying characteristics of the HTTP server by applying one or multiple machine-learning models with purposes to identify the characteristics based on the HTTP server response packets.

12. The method of claim 11, wherein the identifying the characteristics includes at least one of:
    identifying a type of network infrastructure facility;
    identifying network properties of the communication link; and
    identifying vulnerabilities that may be presented in the network.

13. The method of claim 12, wherein the HTTP server is classified between malicious and benign classes, by applying one or multiple machine-learning models with purpose of detecting HTTP servers.

14. The method of claim 13, wherein the HTTP server is labelled as benign or malicious according to suspicious activities, including at least one of:
    a specific type of attack that an HTTP server may perform against a user;
    a known malicious reputation that a type of HTTP server may have;

a software implementation of HTTP which is known to be used for penetrating test purposes; and any type of bad behavior an HTTP server may have that is considered for non-legitimate purposes.

15. The method of claim 1, wherein the extracted features includes using information from the displayed text visible in user screen, which is rendered by the user browser using the data of the HTTP response content, such as HTML data, to be translated into a machine-learning model feature vector.

16. The method of claim 15, wherein the displayed text includes text visible in user screen includes text data that is displayed based on HTTP content of a last HTTP response from the HTTP server.

17. The method of claim 16, further comprising defining a word category as a label for the samples of HTTP server response, using a set of words, from the displayed text visible in user screen, that shares a common property, meaning, or relationship including semantical, syntactical, morphological, or grammatical.

18. The method of claim 17, wherein the features extracted from the displayed text visible in user screen includes at least one of:
- counting a number of times a specific word appears in the displayed text visible in user screen;
- counting a number of words per word category;
- counting a number of times a specific group of words appears together in the displayed text visible in user screen;
- counting a number of times a specific group of words appears together in a specific order;
- counting a number of times a specific group of words appears in sequence together in a specific order;
- binary features representing an existence of specific words, word categories, word groups, or word sequences; and
- any other combination of word, word category, or word groups.

19. The method of claim 1, wherein the features extracted from the collected HTTP server response packets include at least one of:
- a presence of specific HTML tags;
- a count of the number of HTML tags;
- a count of the number of HTML tags inside an HTML tag context;
- a count of the number of HTML tags with specific attributes;
- a count of the number of a specific HTML tag, in which a specific attribute value matches a specific string;
- a count of the number of a specific HTML tag, in which a specific attribute value contains a specific string or character;
- a count of the number of a specific HTML tag, in which a specific attribute starts with or ends with a specific string or characters;
- a count of the number of occurrences of a specific string, character, or sequence of characters appears in a specific attribute value;
- a count of the number of specific strings of the displayed text of the HTML data;
- a count of the number of times a specific tag has a null or invalid value for a specific attribute;
- whether a specific HTML tag exists;
- whether a specific HTML tag with a specific attribute exists;
- whether a specific HTML tag with a specific attribute and a specific attribute value exists;
- a count of the number of HTML comment blocks;
- a count of the number of time a specific tag has a valid value for a specific attribute;
- a count of the number of time a specific media file is loaded;
- a count of the number of times external content is loaded;
- a count of the number of patterns in script source;
- a count of the number of times that a specific tag has a specific attribute with value corresponding to a specific file extension;
- whether page redirection instructions exist in the data;
- a count of the number of times a page redirects instruction occurs;
- a count of the number of words present inside a specific HTML tag context;
- a count of the number of times a specific pattern that indicate the presence of a specific element in a page occurs;
- whether a specific tag is in upper case;
- any other feature that represents a property, the existence of a pattern, or the number of times a pattern occurs in the entire, or part of, the HTTP content, in which the property can be translated into a numeric value; and
- any of the aforementioned features but restricted to a specific HTML tag context instead of the entire HTML data.

20. The method of claim 1, wherein the features extracted from the collected HTTP server response packets include at least one of:
- a total number of header fields;
- a total size of HTTP header;
- a total size of HTTP content;
- a binary feature representing the presence of specific header fields;
- an order between two or more header fields when present;
- a binary feature indicating whether header field names are lower or upper case;
- a binary feature representing the exact match of a header field value with a known value;
- a presence of specific strings in a header field value;
- a presence of specific characters in a header field value;
- a count of specific strings in a header field value;
- a count of specific characters in a header field value;
- a length of a header field value;
- a numeric value of a header field value;
- a number of words present in a header field value; and
- a number of header fields that are unknown by the feature extraction module.

\* \* \* \* \*